Sept. 8, 1959     G. L. ANDERSON ET AL     2,903,005
EMERGENCY CHECK VALVE CONSTRUCTION FOR GAS FLOW METERS
Filed Feb. 7, 1956
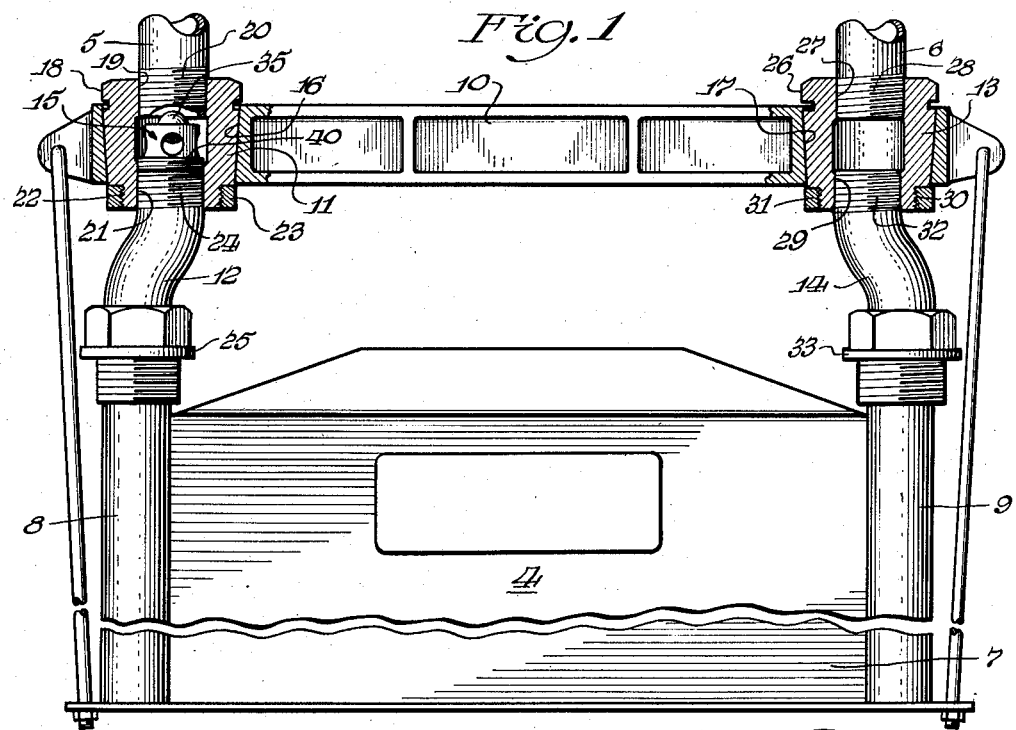
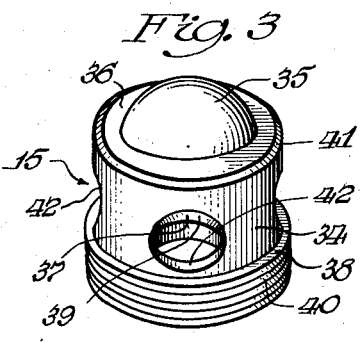
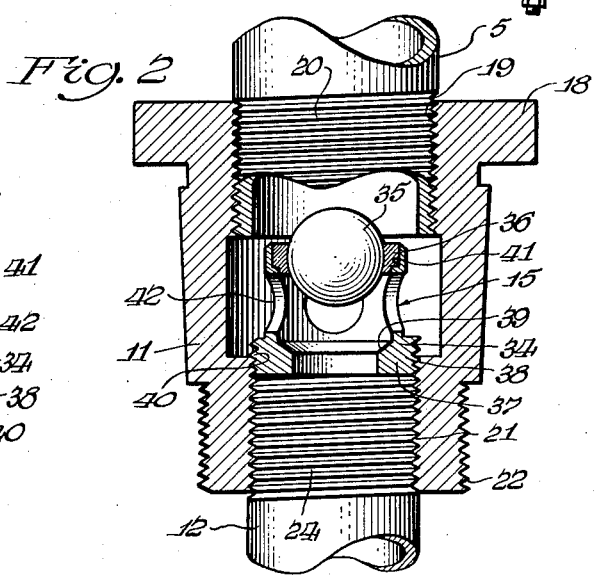
Inventors
Gerald L. Anderson
Jack V. Margason
by
Attorney United States Patent Office 2,903,005
Patented Sept. 8, 1959

2,903,005

EMERGENCY CHECK VALVE CONSTRUCTION FOR GAS FLOW METERS

Gerald L. Anderson and Jack V. Margason, Rockford, Ill., assignors to Eclipse Fuel Engineering Co., Rockford, Ill., a corporation of Illinois Application February 7, 1956, Serial No. 563,951

3 Claims. (Cl. 137—75)

The present invention relates generally to meter connecting devices. More particularly, the invention relates to that type of device which is designed or adapted to connect the inlet and outlet tubes of a conventional gas meter to gas service and house pipes and as its components or parts comprises: (1) a rigid horizontally extending crossbar which is in the form of a one-piece metallic casting, embodies at its ends vertically extending open ended sockets of circular cross section, and is positioned directly beneath the discharge end of the gas service pipe and the receiving end of the house pipe; (2) two vertically extending sleeves which extend through, and are rotatably mounted in, the sockets in the ends of the crossbar, embody in their upper ends internal screw threads for connection to external screw threads on the ends of the two gas pipes, and are provided in their lower ends with internal screw threads; and (3) two offset variety coupling nipples which depend from the ends of the crossbar, embody at the upper ends thereof external screw threads for connection to the internal screw threads in the lower ends of the sleeves, and are provided on their lower ends with coupling rings for connection to the upper ends of the meter tubes.

One object of the invention is to provide a meter connecting device which is an improvement upon, and has certain inherent advantages over, previously designed devices of the aforementioned type and is characterized by the fact that the sleeve that is connected to the discharge end of the gas service pipe and is connected by one of the coupling nipples to the gas inlet tube of the meter is provided with a simple and novel valve arrangement which operates automatically to cut off the flow of gas from the gas service pipe to the inlet tube of the meter when an elevated temperature is encountered due to a fire or explosion in the space around the device and meter, and comprises a ball which is normally held in an elevated position with respect to a circular valve seat by a retaining member of low melting point material and is adapted in the event of melting of the retaining member to drop by gravity into seated relation with the circular seat.

Another object of the invention is to provide a meter connecting device of the last mentioned character and in which the automatic valve arrangement comprises a vertically extending tubular body which is disposed in the central portion of the gas inlet sleeve, embodies at the lower end thereof an integral inwardly extending annular flange that is shaped by machining to form the circular seat for the ball, and also embodies at its lower end an integral annular outwardly extending flange which is screw threaded in such manner as to interfit with, and be connected to, the upper end of the inner internal screw thread in the lower end of the gas inlet sleeve.

A further object of the invention is to provide a meter connecting device of the type and character last mentioned and in which the vertically extending tubular body of the automatic valve arrangement has an annular series of large sized holes in its central portion for permitting the flow of gas therethrough when the ball is in its open position above the annular seat, and the retaining member for the ball is in the form of an annulus which fits within an internal annular groove in the upper end of the body.

A still further object of the invention is to provide a meter connecting device which is generally of new and improved construction, effectively and efficiently fulfills its intended purpose, and possesses a high safety factor.

Other objects of the invention and the various advantages and characteristics of the present meter connecting device will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a side view showing a meter connecting device embodying the invention in connected relation with a gas service pipe, a house pipe and a conventional gas meter, certain parts of the device being shown broken away and other parts being shown in section for illustrative purposes;

Figure 2 is an enlarged vertical section of the sleeve that is connected to the discharge end of the gas service pipe and has the automatic valve arrangement mounted therein; and Figure 3 is a perspective of the automatic valve arrangement.

The device which is shown in the drawing constitutes the preferred form or embodiment of the invention and is adapted for use in connecting a gas meter 4 to a gas service pipe 5 and a house pipe 6. The meter 4 is of standard or conventional design and embodies a box-like housing 7 having a gas inlet tube 8 at one side thereof and a gas outlet tube 9 at its other side. The tubes extend vertically and have the upper ends thereof disposed above the top of the meter housing 7 and provided with external screw threads. The gas service pipe 5 extends vertically and is connected to, and leads from, a gas main (not shown). The house pipe 6 extends vertically and serves to conduct gas from the meter 4 to gas consuming appliances (not shown). The discharge end of the gas service pipe 5 and the receiving end of the house pipe 6 are spaced a short distance apart and overlie the meter 4 as shown in Figure 1 of the drawing. As its components or parts the meter connecting device comprises a horizontally extending crossbar 10, a sleeve 11 and a depending coupling nipple 12 at one end of the crossbar, a sleeve 13 and a depending coupling nipple 14 at the other end of the crossbar, and an automatic valve arrangement 15 in the sleeve 11. Except for the automatic valve arrangement 15 the meter connecting device is standard or conventional and follows the design, construction and mode of operation of that which is disclosed in, and forms the subject matter of, United States Reissue Patent No. 20,308, granted on March 23, 1937 and entitled "Meter Connecting Device."

The crossbar 10 of the device is preferably in the form of a one-piece metallic casting and is disposed in a horizontal position between the box-like housing 7 of the meter 4 and the discharge end of the gas service pipe and the receiving end of the house pipe 6. It is rigid or non-adjustable and embodies at its ends a pair of vertically extending open ended sockets 16 and 17 of circular cross section. As shown in Figure 2 of the drawing, the two sockets are downwardly tapered to a small degree or extent. The socket 16 is disposed beneath, and coaxially aligned with, the gas discharge end of the gas service pipe 5 and the other socket, i.e., the socket 17, is disposed directly beneath, and in coaxial alignment with, the receiving end of the house pipe 6.

The sleeve 11 of the meter connecting device extends vertically and with the depending coupling nipple 12 forms means for connecting the discharge end of the gas service pipe 5 to the upper end of the gas inlet tube 8. It is circular in cross section, extends through, and in rotatably mounted in, the vertically extending open ended socket 16, and is preferably in the form of a one-piece metallic casting. The central portion of the sleeve 11 is downwardly tapered in conformity with the socket 16. The upper end of the sleeve 11 is disposed for the most part above the socket 16, embodies an integral outwardly extending polygonal flange 18, and is provided with an internal screw thread 19 whereby it is removably connected to a corresponding or interfitting external screw thread 20 on the discharge end of the gas service pipe 5. The flange 18 permits the sleeve 11 to be gripped by a wrench or other turning tool in connection with installation of the meter connecting device. The lower end of the sleeve 11 projects an appreciable distance beneath the lower end of the socket 16 and is provided with an internal screw thread 21 and an external screw thread 22. As shown in Figure 2 the internal screw thread is of less diameter than the internal screw thread 19. A nut 23 is mounted on the external screw thread 22 and serves when tightened to lock the sleeve 11 against turning or rotation relatively to the crossbar 10.

The depending coupling nipple 12 is of the offset type or variety and extends between, and serves to connect, the sleeve 11 and the gas inlet tube 8 of the meter 4. The upper end of the coupling nipple 12 extends into the lower end of the sleeve 11 and is removably connected thereto by way of an external screw thread 24 which is in interfitting relation with the internal screw thread 21 in the lower end of the sleeve 11. The lower end of the depending coupling nipple 12 is provided with a coupling ring 25 whereby it is connected to the external screw thread on the upper end of the gas inlet tube 8 of the meter. When the meter connecting device is in assembled relation with the pipes 5 and 6 and the meter 4, the gas emanating from the discharge end of the gas service pipe 5 flows first through the sleeve 11, then downwards through the offset coupling nipple 12 and then through the inlet tube 8 and into the box-like housing 7 of the meter 4.

The sleeve 13 of the meter connecting device extends vertically and with the depending coupling nipple 14 forms means for connecting the gas outlet tube 9 of the meter 4 to the receiving end of the house pipe 6. It is the same in size and design as the sleeve 11 and extends through, and is rotatably mounted in, the vertically extending open ended socket 17. The upper end of the sleeve is disposed for the most part above the socket 17, embodies an integral outwardly extending polygonal flange 26 and is provided with an internal screw thread 27 whereby it is removably connected to a corresponding or interfitting external screw thread 28 on the receiving end of the house pipe 6. The flange 26 permits the sleeve 13 to be gripped by a wrench in connection with assembly of the device. The lower end of the sleeve 13 projects an appreciable distance beneath the lower end of the socket 17 and is provided with an internal screw thread 29 and an external screw thread 30. A nut 31 is mounted on the external screw thread 30 and serves when tightened to lock the sleeve 13 against turning or rotation in the socket 17.

The depending coupling nipple 14 is of the offset type and extends between, and serves to connect, the gas outlet tube 9 to the sleeve 13. The upper end of the coupling nipple 14 extends into the lower end of the sleeve 13 and is removably connected thereto by way of an external screw thread 32 which is in interfitting relation with the internal screw thread 29 in the lower end of the sleeve 13. The lower end of the depending coupling nipple 14 is provided with a coupling ring 33 whereby it is connected to the external screw thread on the upper end of the gas outlet tube 9 of the meter. When the meter connecting device is in its assembled condition, the gas after flowing through the housing 7 of the meter 4 flows upwards into the house pipe 6 via the gas outlet tube 9, the depending offset coupling nipple 14, and the vertically extending rotatable sleeve 13.

The automatic valve arrangement 15 of the meter connecting device is in the form of an accessory and serves when the temperature of the air around the meter 4 and the crossbar 10 rises to a predetermined temperature due to a fire, explosion or other cause automatically to shut off the flow of gas to the inlet tube 8 of the meter. It is of unitary character and consists of a vertically extending tubular seat-forming and ball-retaining body on pedestal 34, a ball 35 and a ball-retaining member 36. The body 34 is located for the most part in the central portion of the sleeve 11 in the vertically extending open ended socket 16 in the gas receiving end of the crossbar 10 and is preferably in the form of a one-piece metallic casting or a die casting. It is of circular cross section and is so proportioned that it is spaced inwards from the central portion of the sleeve 13 (see Figure 2). The lower end of the body 34 is provided with an integral annular inwardly extending flange 37 and an integral annular outwardly extending flange 38. The annular inwardly extending flange 37 has the upper portion thereof machined to form a circular downwardly tapered seat 39 for receiving the ball 35 when the latter is released upon melting of the retaining member 36 as described more in detail hereafter. The integral annular outwardly extending flange 38 is provided with an external screw thread 40 which interfits with the upper end of the internal screw thread 21 in the lower end of the rotatable sleeve 11 and serves removably to secure the tubular body 34 in its operative or normal position in the central portion of the interior of said sleeve 11. The automatic valve arrangement is preferably mounted in place by inserting the upper end and central portions of the vertically extending tubular body 34 into the lower end of the sleeve 11 and then after the external screw thread 40 on the outwardly extending flange 38 is brought into engagement with the lower end of the internal screw thread 21 turning the body until it is fed upwards into its normal position as shown in Figure 2. After the body has been turned to the proper desired extent, the lower end of the body is subjected to a staking operation to the end that the body is frictionally held against turning movement out of its proper operative position. Instead of being mounted or installed as heretofore mentioned, the valve arrangement may be operatively positioned by inserting it downwards through the upper end of the sleeve 11 and then after the external screw thread 40 is brought into engagement with the upper end of the internal screw thread 21 turning the body until it is fed downwards into its proper or desired position within the sleeve 11. The upper end of the body 34 is provided with an internal or inwardly facing annular groove 41 in which the ball-retaining member 36 fits snugly. The central portion of the vertically extending tubular body 34 is provided with an annular series of large sized holes 42. The latter are preferably four in number as shown in the drawing and serve when the ball 35 is in its open position wherein it is in elevated relation with respect to the annular downwardly tapered seat 39 to permit gas to flow from the interior of the sleeve 11 into the body 34 as a preliminary to down flow through the coupling nipple 12 and the inlet tube 8 into the box-like housing 7 of the meter 4. The ball 35 is normally positioned in the upper end of the vertically extending tubular body 34 where it is in an elevated or open position with respect to the annular downwardly tapered seat 39. It is formed of polished steel or other suitable material and is of such diameter that when it is released and falls by gravity onto the seat, it engages the seat snugly and hence prevents flow of gas through the tubular body 34. The retaining member 36 is formed of any suitable low melting point metal or metal alloy and operates to retain the ball 35 in its normal or open position until such time as melting of the member occurs due to a fire or unusually high heat conditions in the space around the meter 4. In practice it has been found that desirable results are obtained when the metal or alloy of which the retaining member is formed is of such character that it melts at a temperature of approximately 220° F. The ball-retaining member is in the form of an annulus and has its inner portion extending around and shaped conformably to the portion of the ball of maximum girth. The outer portion of the annular retaining member fits snugly in the internal annular groove 41 in the upper end of the vertically extending tubular body 34. When the temperature of the gas within the sleeve 11 rises to such an extent that the temperature of the retaining ring which it envelops rises above the melting temperature of the latter, the ball 35 is released. The ball upon release thereof drops by gravity into its closed position wherein it seats within the seat 39 and as previously pointed out shuts off the flow of gas through the body 34.

The sleeve 11 and the automatic valve arrangement 15, when installed within the sleeve, constitutes, in effect, an emergency check valve assembly for the gas meter 4, the assembly being positioned in an appropriate location exteriorly of the meter housing 7 wherein it is exposed to the ambient temperature surrounding the meter so that in the event of abnormal conditions of heat such as may occur in the event that the building which houses the meter is on fire, the valve will operate to cut the flow of gas in the gas line.

The herein described meter connecting device effectively and efficiently fulfills its intended purpose and possesses a high safety factor by reason of the fact that it includes the automatic valve arrangement 15 in the rotatable sleeve 11. The particular automatic valve arrangement is capable of being readily mounted in a conventional or standard sleeve-type meter connecting device and due to the particular design and construction thereof is capable of being manufactured or fabricated at a comparatively low cost.

Whereas the automatic valve arrangement has been illustrated and described as being mounted in the gas inlet sleeve 11, it is to be understood that it may in certain instances be mounted in the gas outlet sleeve 13. It is also to be understood that the present meter connecting device is not to be restricted to the details set forth since they may be modified within the scope of the appended claims without departing from the spirit and scope of the invention.

Having thus described the invention what we claim as new and desire to secure by Letters Patent is:

1. An emergency flow check valve for connection between a source of gaseous fluid under pressure and a device acting responsively to the flow of such fluid through the valve, a tubular open-ended valve casing having a cylindrical bore extending axially and vertically therethrough, the upper end region of said bore being interiorly threaded for reception of the threaded end of a fluid supply pipe, the lower end region of the bore being interiorly threaded for reception of the threaded end of a pipe leading to the fluid flow responsive device, the portion of said bore intermediate the threaded ends thereof defining a valve chamber, a self-contained combined pedestal and valve seat element disposed within said casing, said element comprising a tubular body having its lower end threadedly received within the threaded lower end region of said valve casing, said body being disposed for the most part within said valve chamber, a heat-fusible supporting ring mounted on the upper end of said body and coaxial therewith, a ball valve element fixedly supported by said ring, the diameter of said valve element being less than the internal diameter of said tubular body, the lower threaded end of said tubular body being formed with an internal annular valve seat spaced below and from said ball valve element, the wall of said tubular body intermediate said seat and ring being provided with at least one opening therethrough for the by-pass flow of fluid downwardly around said ball valve element and through said valve chamber while the ball valve element is supported by said ring, said ring being adapted, when a predetermined maximum temperature is attained within the valve chamber to become fused to release said ball for fall by gravity onto said valve seat.

2. An emergency flow check valve as claimed in claim 1 wherein said lower threaded end region of the tubular body is of greater external diameter than the external diameter of the remainder of the body whereby the body may be threaded into operative position within the valve chamber through the lower end region of the valve casing.

3. An emergency flow check valve as claimed in claim 2 wherein the internal diameter of the lower end region of said valve casing is less than the internal diameter of the upper end region of the valve casing whereby the body may be selectively threaded into operative position within the valve chamber through the lower end region of the valve casing or passed through said upper end region of the valve casing downwardly and thereafter threaded into said lower end region.

References Cited in the file of this patent

UNITED STATES PATENTS

| | | |
|---|---|---|
| 1,881,846 | Morse et al. | Oct. 11, 1932 |
| 1,930,624 | Ryan | Oct. 17, 1933 |
| 1,938,967 | Lovekin | Dec. 12, 1933 |
| 1,947,372 | Bard | Feb. 13, 1934 |
| 2,020,558 | Lovekin | Nov. 12, 1935 |
| 2,128,292 | Fin | Aug. 30, 1938 |
| 2,192,541 | Davis | Mar. 5, 1940 |
| 2,707,965 | Allen | May 10, 1955 |

FOREIGN PATENTS

| | | |
|---|---|---|
| 398,135 | Great Britain | Sept. 7, 1933 |